Figure 1:
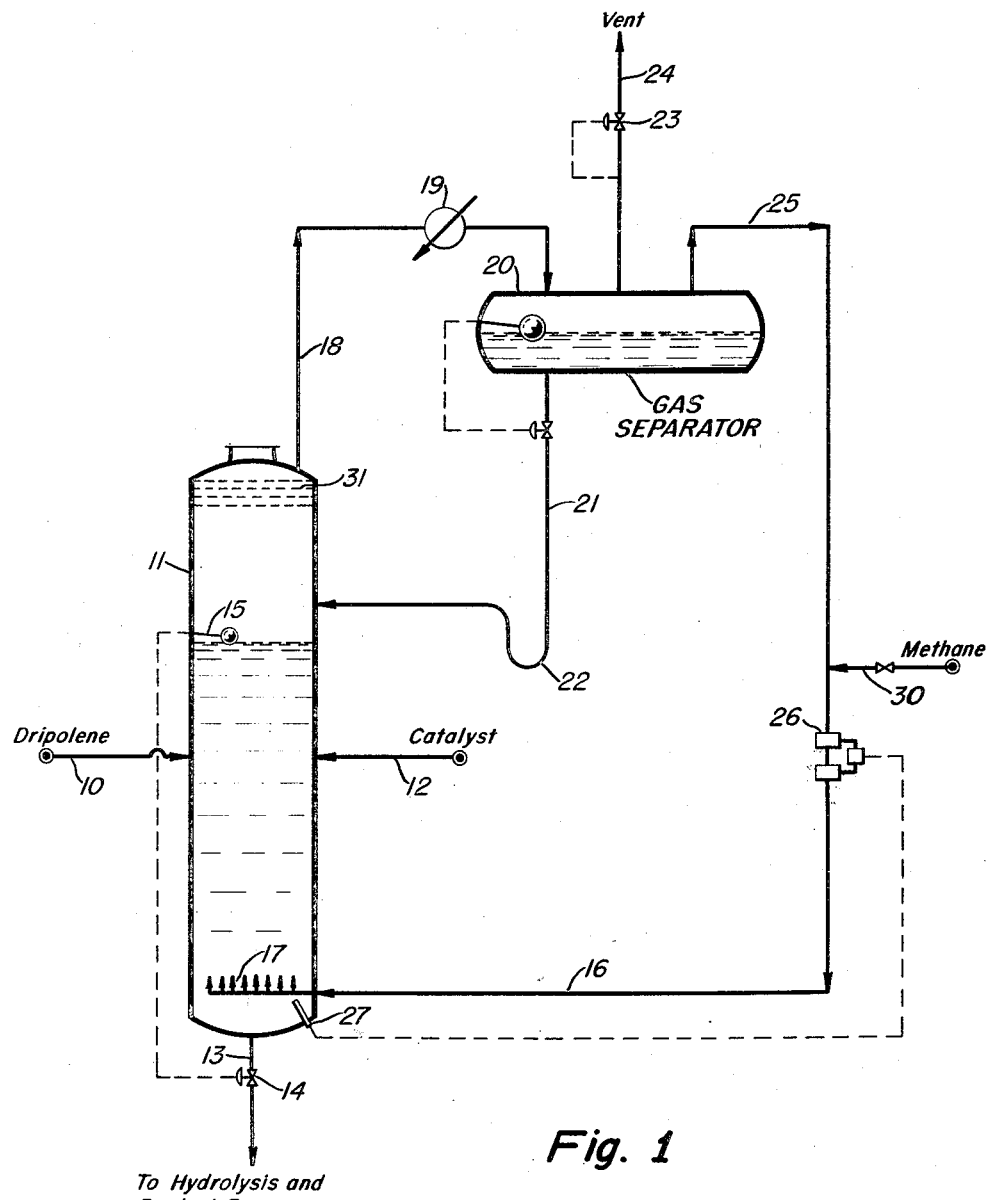

Feb. 11, 1958   J. A. RIDGWAY, JR   2,823,198
GAS STRIPPING TYPE AUTO-REFRIGERATION SYSTEM
Filed May 21, 1954   2 Sheets-Sheet 1

INVENTOR.
John A. Ridgway, Jr.
BY
ATTORNEY

United States Patent Office 2,823,198
Patented Feb. 11, 1958

2,823,198

GAS STRIPPING TYPE AUTO-REFRIGERATION SYSTEM

John A. Ridgway, Jr., Texas City, Tex., assignor to The American Oil Company

Application May 21, 1954, Serial No. 431,385

8 Claims. (Cl. 260—82)

This invention relates to a gas stripping type auto-refrigeration system for controlling the temperature of a liquid phase exothermic reaction such, for example, as the polymerization of normally liquid unsaturated hydrocarbons obtained in the high temperature pyrolysis of normally gaseous hydrocarbons, the polymerization product being a synthetic hydrocarbon resin.

It has long been known that synthetic hydrocarbon resins can be prepared by polymerization of normally liquid unsaturated hydrocarbons produced by high temperature pyrolysis (often called "dripolene") as described, for example, in U. S. 1,836,629, 1,982,707, 2,161,599, etc. To obtain products of required quality the temperature of the polymerization must be closely controlled since the reaction is highly exothermic and excessive temperatures lead to product degradation. Prior methods of temperature control were subject to serious disadvantages. The use of sufficiently reduced pressure to effect refrigeration by boiling light liquid components of the charge is unsatisfactory because of excessively high capital investment and operating costs and the danger of air leakage into the system. Attempts to use auto-refrigeration by adding a low boiling paraffin hydrocarbon are ruled out because the added materials result in the formation of undesirable insoluble resins; furthermore, this technique is too costly from the standpoint of capital investment and operating expense. Indirect heat exchange is unsatisfactory because the surfaces of internal coolers are subject to corrosion and fouling making it practically impossible to obtain the required temperature control for a long period of time. An object of this invention is to provide an improved temperature control system which avoids these objections and difficulties and to provide a refrigeration system which is inexpensive to build and operate and at the same time is capable of continuously maintaining close temperature control over long periods of time.

A further object is to obtain the required mixing and intimacy of contact between catalyst and reactants in an exothermic reaction zone without the necessity of having stirrers or other moving mechanical parts come into direct contact with reactor contents. Other objects will be apparent as the detailed description of the invention proceeds.

In practicing the invention a reaction zone is operated at about atmospheric pressure or somewhat higher and heat is removed from the reactor contents at a temperature below the boiling point thereof by passing a large volume of an inert gas upwardly through the reactor contents at a sufficient velocity to obtain effective mixing and intimate contact of reactor contents and in amount sufficient to reduce the partial pressure of vaporizable diluent contained therein, causing it to partially vaporize and thus supply the required refrigeration. In one embodiment the gas stream containing diluent vapors is cooled as it leaves the reactor to effect liquefaction of the condensable components which are returned via a gas separator to the reactor to maintain the required amount of diluent and effect a portion of the cooling. The uncondensed gas is compressed and returned to the bottom of the reactor to serve its combined role of agitation and refrigeration, the rate of gas introduction being controlled in accordance with the temperature in the reactor. When it is necessary to use cooling water which is not sufficiently low in temperature to effect the desired condensation, then the gas stream containing the diluent vapors is compressed as it leaves the reactor and then cooled to liquify the condensable components which are then returned to the reactor via a gas separator. In this latter case uncondensed gas is introduced directly to the bottom of the reactor, the rate of introduction being controlled by the temperature of the reactor. Preferably, in either case of compressing before the cooling or compressing after the cooling, the charge stock and catalyst are continuously added to the reactor at points substantially below the liquid interface and an effluent product stream is withdrawn from the reactor at the rate required to maintain a constant liquid interface level. An entrainment arrestor may be provided at the top of the reactor. Condensate separated from the overhead gas stream is collected in a gas separator in which the liquid level is maintained at a higher level than the liquid level in the reactor and returned to the reactor by gravity.

Figure 2:
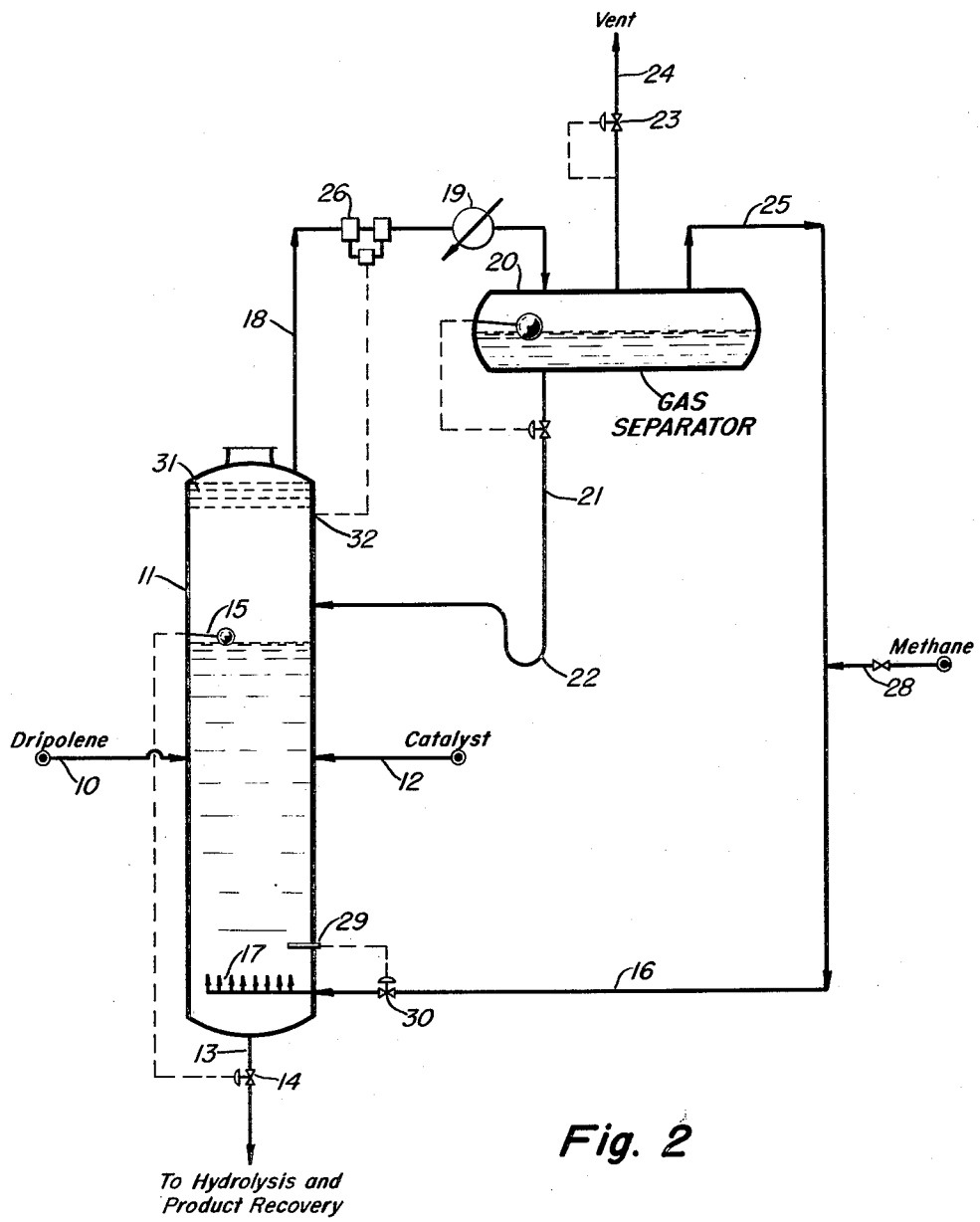

The invention will be more clearly understood from the following detailed descriptions of two specific embodiments represented by Figure 1 and Figure 2, respectively; both drawings form a part of this specification and are schematic flow diagrams of the improved gas stripping type auto-refrigeration system as applied to the polymerization of a fraction of dripolene.

In Figure 1, about 10,300 pounds per hour of a dripolene fraction is introduced by line 10 to reactor 11. This dripolene may be a total or crude dripolene or it may be a distillate or bottoms fraction thereof; preferably it is a so-called "80 percent dripolene overhead" fraction containing about 70 to 90 percent of the total crude dripolene and obtained by a flash or fractional distillation of crude dripolene. Crude dripolene, in turn, is a by-product obtained by pyrolysis of a hydrocarbon, preferably a normally gaseous hydrocarbon such as propane, propylene and/or $C_4$ hydrocarbons, such pyrolysis being obtained at a temperature of about 1300 to 1550° F., a pressure of atmospheric to 100 p. s. i. g. and a contact time in the range of .2 to 5 seconds. The hot gases leaving the pyrolysis zone are immediately quenched to about 100° F. or lower and the dripolene is recovered from quenched liquid by stratification or distillation. The crude dripolene thus obtained has approximately the following properties and composition:

| | |
|---|---|
| ASTM distillation range, ° F.: | |
| Initial | 100 |
| 10% | 146 |
| 20% | 162 |
| 30% | 178 |
| 40% | 188 |
| 50% | 196 |
| 60% | 206 |
| 70% | 234 |
| 80% | 296 |
| 90% | 340 |
| Final | 360 |
| Gravity, ° API at 60° F | 34.7 |
| Bromine number, cg. $Br_2$/g | 104.1 |
| Maleic anhydride value, mg. M. A./g | 79 |
| Index of refraction, $n_D^{25}$ | 1.4830 |
| Analysis, volume-percent: | |
| Propane and propylene | 0.7 |
| Isobutane | 0.1 |
| Isobutylene | 0.8 |
| 1-butene | 0.5 |
| 2-butene | 0.6 |
| n-Butane | 0.4 |
| Butadiene | 3.9 |

| | |
|---|---|
| Pentadienes | 7.7 |
| Pentylenes | 6.3 |
| Other $C_5$ | 0.4 |
| Benzene | 34.2 |
| Toluene | 7.8 |
| Xylenes | 1 |
| Styrene | 3 |
| Dicyclopentadiene | 5 |
| Other | 29.6 |

Catalyst is introduced into reactor 11 by line 12 at approximately the same level as the introduced dripolene fraction, the streams preferably being impinged against each other. The catalyst in this example contains about 23 weight percent aluminum chloride, 74.5 weight percent aromatics and 2.5 weight percent $CO_2$. It is prepared batchwise by introducing about 1,840 gallons (13,330 pounds) of an aromatic hydrocarbon mixture of toluene and xylenes into a glass lined tank, adding about 4,117 pounds of anhydrous aluminum chloride, warming up the mixture to about 160° F. while stirring, passing gaseous carbon dioxide through the mixture until the solution of aluminum chloride is complete (which may require about 4 hours) and cooling the reaction mixture to about 90° F. Because of the corrosive nature of the complex it should be handled in glass lined equipment (or corrosion resistant alloy such as Hastelloy A or B) and Teflon should be employed for all gaskets. Care must be taken to avoid water in the system and $CO_2$ is used as a blanketing gas.

Reactor 11 is a vertical carbon steel vessel about 4 feet in diameter and 16 feet high and in this example it is operated at a pressure of about 30 p. s. i. a. and a temperature of about 180° F. with an average holding time or reaction period of about 1 hour. A slurry of insoluble polymer in unreacted hydrocarbon together with catalyst complex is withdrawn from the reactor through line 13 at a rate regulated by valve 14 which is automatically controlled by liquid level control means 15 so that said level is held constant. The reactor effluent stream then passes to a hydrolysis and neutralization system (not shown) wherein it is contacted with water to spring the aluminum chloride and arrest the polymerization, the unreacted aluminum chloride being recovered as aluminum chloride hydrate and the product being freed from catalyst contaminants and fractionated for recovery of the desired resin together with by-product benzene and other hydrocarbon fractions.

In order to remove the exothermic heat of polymerization and to hold the reaction temperature at about 180° F. in an inert non-condensable gas such as methane is introduced at the base of the reactor through line 16 and distributor 17 at the rate of 690 cubic feet per minute (about 5,430 pounds per hour). The introduced gas causes vigorous agitation and intimate mixing of reactants with catalyst and at the same time it strips low boiling hydrocarbons from the reaction mixture so that these low boiling hydrocarbons are vaporized at a temperature below their 30 p. s. i. a. boiling point. The mixture of stripping gas and vapors is passed from the top of the reactor through line 18 and condenser 19 to gas separator 20 which is at a substantially higher level than the liquid level in the reactor so that condensed liquid may be returned by gravity flow through line 21 and liquid trap 22 back to the reactor just above the level of the liquid interface therein. Pressure in the reaction system is held constant by back pressure control valve 23 in gas separator vent line 24. Uncondensed gas is withdrawn from the top of the separator by line 25, compressed to about 38 p. s. i. a. by compressor 26 and returned through line 16 back to the reactor together with any condensate formed due to compression. The operation of centrifugal compressor 26 is controlled by the maximum temperature in the reactor as indicated by thermocouple 27 so that additional gas is introduced if the temperature tends to rise and less gas is introduced if the temperature tends to fall.

The stream compositions are substantially as follows:

| Stream | In Line 18 (at 180° F.) | In Line 21 (at 100° F.) | In Line 25 (at 100° F.) |
|---|---|---|---|
| Composition (mol percent): | | | |
| $CH_4$ | 55.95 | 0.65 | 82.11 |
| $iC_4$ | 2.54 | 0.99 | 3.26 |
| $nC_5$ | 2.95 | 3.53 | 2.68 |
| $iC_5$ | 1.80 | 1.83 | 1.78 |
| $nC_6$ | 1.27 | 2.59 | 0.64 |
| Bz | 31.43 | 78.88 | 9.00 |
| Tol | 4.06 | 11.53 | .53 |
| Mol Wt | 43.2 | 78.9 | 26.3 |
| Lb./hr | 13,132 | 7,702 | 5,430 |
| B./S. D | | 613.5 | |
| C. F. M | 1,160 | | 690 |
| °API | | 32.8 | |

It will thus be seen that about 7,700 pounds per hour of condensed liquid is returned to the upper part of the reactor to serve the combined functions of diluent and refrigerant but essential temperature control is obtained by the stripping action of the recycled gas stream which in this case is introduced at the base of the reactor at 690 cubic feet per minute. The amount of recycled gas will depend, of course, upon the temperature to be maintained in the reactor and if it is desired to effect polymerization at 30 p. s. i. a. and 150° F. the gas recycle rate may be about 3,820 cubic feet per minute. Thus at this gas recycle rate there is sufficient vaporization of the light components to maintain the reactor contents below its boiling point of about 220° F. at 30 p. s. i. a.

In the above table all $C_4$ and lighter components originally present in the dripolene are lumped together as isobutane. Since the dripolene charge may contain small amounts of components which will not condense in condenser 19 and which might build up in the recycle gas, such gas may be vented from the system by vent line 24 when necessary to reduce the volume of gas being recycled. Additional inert gas such as natural gas or methane can be introduced by line 30 in required amounts should the quantity of recycle gas be reduced due to its solubility in the reactor contents.

The system shown in Figure 2 is the same as in Figure 1 except it offers the added advantage of being able to utilize condenser water which is at too high a temperature to operate satisfactorily in the system of Figure 1. Whenever possible the same reference numerals have been used in Figures 1 and 2 to indicate like pieces of equipment and flow lines. The effluent from reactor 11 passes through line 18 to compressor 26 where it is compressed sufficiently to liquify a substantial portion of the condensable components of the effluent in condenser 19 at the temperature of the cooling water available. The compressed gas and condensed liquids from condenser 19 are separated in gas separator 20. The separated condensate is returned to the reactor via line 21 to perform additional cooling. The uncondensed gas from separator 20 is introduced via lines 25 and 16 and valve 30, to reactor 11, through spider 17. The rate of gas introduction is controlled by thermocouple 29 which operates valve 30. Additional gas is introduced if the temperature rises and less if the temperature falls. The operation of compressor 26 is controlled by pressure point 32 so as to maintain the reactor at the desired pressure. The pressure of gas separator 20 is controlled by venting excess recycle gas through valve 23 and line 24 or by introducing additional inert gas through line 28 should the quantity of recycle gas be reduced due to its solubility in the reactor contents.

Under the design conditions hereinabove outlined the vapor velocity at the top of the reactor should be sufficiently low to avoid entrainment difficulties but it is desirable that an entrainment arrestor 31 be mounted in the upper part of the reactor between the liquid level and the gas outlet. This entrainment arrestor may be in the form of staggered pancake cooling coils which at least partly serve the function of condenser 19 so that condensed light hydrocarbons may drip directly from the cooling coils back to the liquid in the reactor. Other modifications and alternative arrangements will be apparent from the above description to those skilled in the art.

While the invention has been described in connection with a particular example it should be understood that it is applicable to other charging stocks, catalysts and operating conditions and it is particularly advantageous in cases where the desired operating temperature is below the boiling point of the reaction mixture since it enables temperature control without resort to operation under a vacuum.

I claim:

1. The method of producing a synthetic resin by polymerization of polymerizable components in a normally liquid hydrocarbon produced by high temperature hydrocarbon pyrolysis and containing substantial amounts of butadiene and pentadienes and larger amounts of benzene which method comprises continuously introducing such charging stock and a polymerization catalyst into a reaction zone operated under a positive pressure above atmospheric and withdrawing liquid reactor effluent at a rate to maintain a substantially constant liquid level in the reaction zone, maintaining said reaction zone at a substantially constant polymerization temperature in the range of about 150 to 220° F. and maintaining intimate admixture between catalyst and charging stock by introducing an inert gas at the base of said reaction zone at a rate to strip substantial amounts of benzene from the liquid, cooling the gas stream leaving the liquid to effect condensation of most of the benzene and returning said condensate to the liquid in the reaction zone, compressing uncondensed gas for recycle to the base of the reaction zone, increasing said rate of gas introduction at the base of the reaction zone when said temperature tends to rise and decreasing said rate of inert gas introduction when said temperature tends to fall.

2. The method of claim 1 wherein the catalyst is an aluminum chloride aromatic hydrocarbon complex containing carbon dioxide.

3. The method of claim 1 in which the gas consists chiefly of methane.

4. The method of claim 1 wherein the inert gas comprises a light hydrocarbon gas which is not condensable in the cooling step and maintaining a substantially constant amount of circulating gas in the system by venting any excess of gas which accumulates therein and supplying any deficiency of gas caused by removal of gas dissolved in liquid product.

5. The method of making a hydrocarbon resin which method comprises continuously introducing into a reaction zone a normally liquid hydrocarbon charging stock consisting chiefly of olefins, diolefins and aromatics and boiling chiefly in the gasoline boiling range and also introducing into said reaction zone an aluminum chloride hydrocarbon complex catalyst, effecting conversion of charging stock components to a hydrocarbon resin by effecting intimate contact of said catalyst with said charging stock in said reaction zone at an absolute pressure of about 2 atmospheres at a temperature in the range of about 150° F. to 220° F. and with an average holding time of approximately one hour, continuously withdrawing product slurry at a rate to maintain a substantially constant reactant level in the reaction zone, continuously withdrawing gases and vapors from the reaction zone, condensing a substantial portion of the withdrawn vapors and returning the condensate to the reaction zone, introducing a large volume of uncondensed gases and vapors at the base of said reaction zone and maintaining a substantially constant temperature in said reaction zone by regulating the rate at which uncondensed gases and vapors are introduced at the base of said reaction zone.

6. The method of making a hydrocarbon resin, which method comprises introducing into a reaction zone a charging stock consisting chiefly of olefins, diolefins, and aromatics boiling chiefly in the gasoline boiling range and produced by pyrolysis of a hydrocarbon at a temperature of about 1300 to 1550° F., the aromatic component of the charging stock being chiefly benzene, also introducing into said reaction zone an aluminum chloride catalyst, effecting conversion of charging stock components to a hydrocarbon resin by effecting intimate contact of said catalyst with said charging stock in said reaction zone at an absolute pressure of about 2 atmospheres and at a substantially constant temperature in the range of about 150 to 220° F. and maintaining said temperature constant in spite of the exothermic nature of the reaction by passing an inert gas upwardly through the liquid phase in the reaction zone in an amount to strip sufficient vaporizable components therefrom to effect substantial and controlled refrigeration, cooling the vapor gas mixture leaving the liquid phase to effect condensation of condensable components contained therein, returning the condensate thus produced to the reaction zone and recycling uncondensed gas to the bottom of the reaction zone at a rate to maintain said substantially constant temperature therein.

7. The mehod of claim 6 which includes the steps of returning condensed liquid by gravity to the reaction zone, compressing uncondensed gas after condensate has been removed therefrom and controlling the rate of compression in accordance with the temperature in the reaction zone.

8. The method of claim 6 which includes the steps of compressing the vapor gas mixture leaving the reaction zone, cooling and separating a condensate from the compressed gas, returning the condensate to the reaction zone and recycling the uncondensed gas to the bottom of the reaction zone at a rate sufficient to maintain substantially constant temperature therein.

References Cited in the file of this patent

UNITED STATES PATENTS

| | | |
|---|---|---|
| 2,161,599 | Towne | June 6, 1939 |
| 2,694,700 | Shanta | Nov. 16, 1954 |